United States Patent Office 2,871,176
Patented Jan. 27, 1959

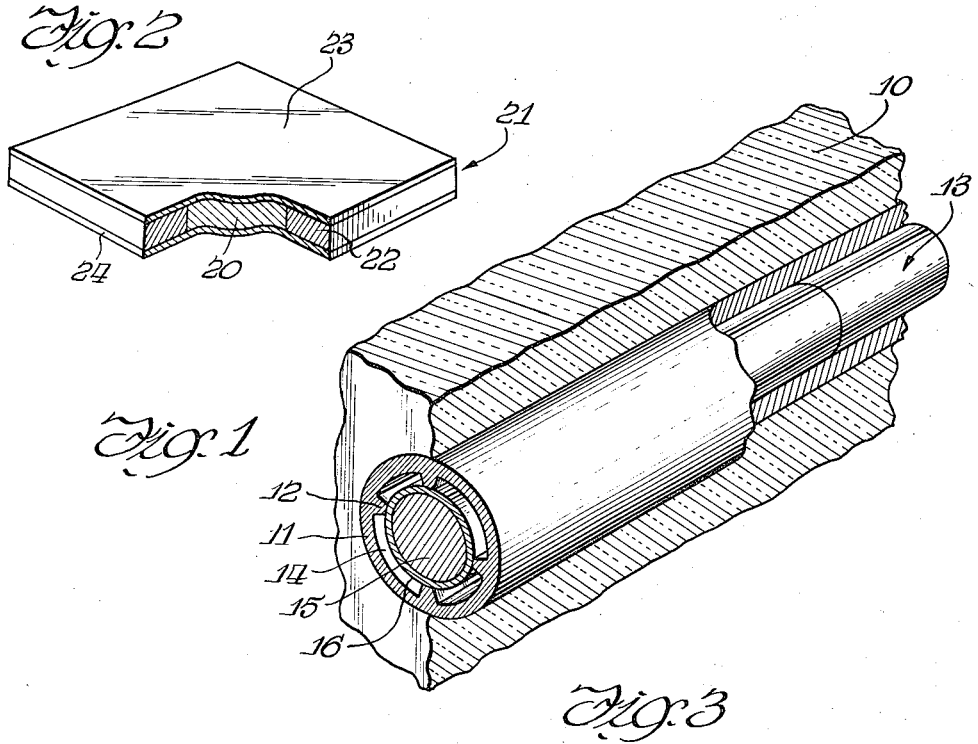
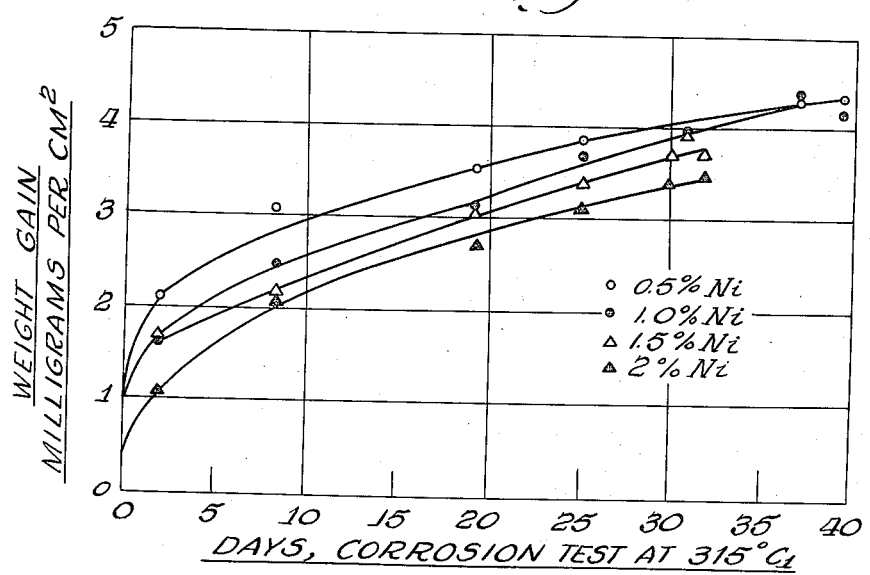

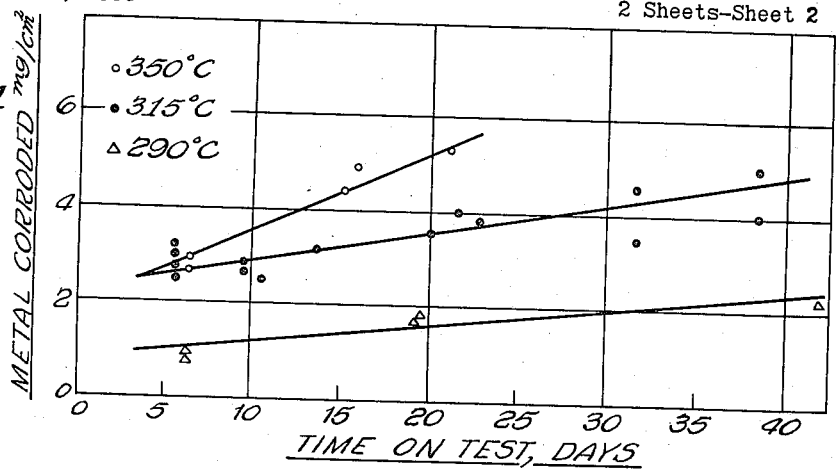
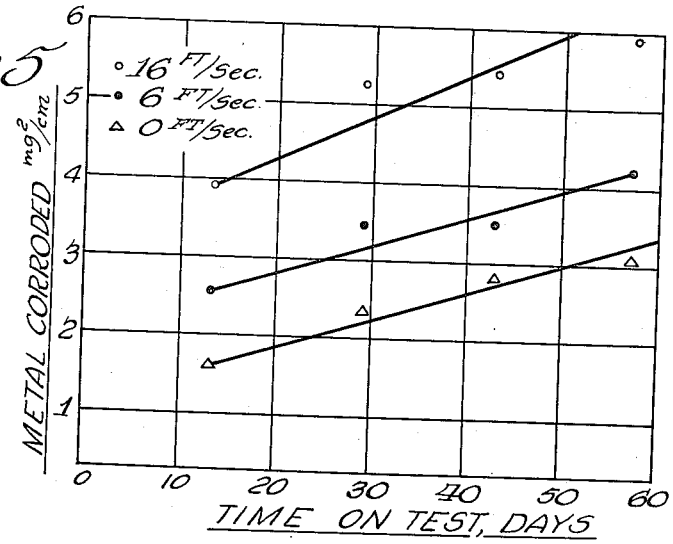
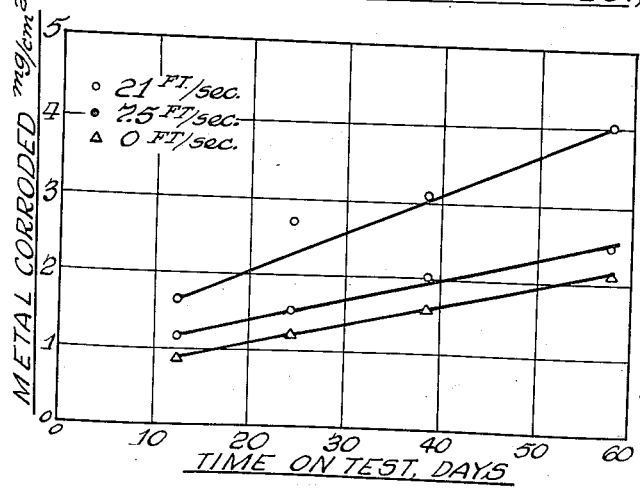

2,871,176

NUCLEAR REACTOR COMPONENT CLADDING MATERIAL

Joseph E. Draley, Clarendon Hills, and Westly E. Ruther, Skokie, Ill., assignors to the United States of America as represented by the United States Atomic Energy Commission Application March 2, 1956, Serial No. 569,215

11 Claims. (Cl. 204—193.2)

This invention relates to an improvement in nuclear reactors. In more detail the invention relates to an improvement in a subassembly for nuclear reactors comprising a moderator, coolant tubes contained in the moderator, and fuel elements contained within the coolant tubes wherein the coolant tubes and the casings or coatings for the fuel elements are formed of an alloy of aluminum and nickel which is more resistant to corrosion by water under radiative conditions than is aluminum itself and may be used at temperatures much higher than aluminum alone can be used. A more limited aspect of the invention relates to a fuel element comprising a core of a fissionable material and a casing or coating of a corrosion resistant aluminum alloy.

Fermi et al. disclose in Figures 37 to 39 of Patent No. 2,708,656 a water-cooled reactor including a solid moderator, coolant tubes imbedded in the moderator and fuel elements contained within the coolant tubes. Aluminum is specified as being the preferred material for use in construction of the coolant tubes and the casings for the fuel elements. Commercial wrought aluminum containing .3 to .5% iron, known as 2S alloy may be used up to a water temperature of approximately 200° C. and is frequently used in nuclear reactors. However, at elevated temperatures most aluminum alloys in water suffer severe penetrating attack, resulting in relatively rapid destruction of the material. This occurs because a transition in corrosion behavior takes place above approximately 200° C. Above that temperature the metal develops blisters of mixed aluminum oxide and metal at an accelerating rate, with penetration into the metal, and it is rapidly rendered useless. Accordingly commercial aluminum and other commercially available aluminum alloys are not suitable for use in reactors which are operated under conditions where the cooling water may reach a temperature over 200° C. Use of aluminum in reactors which are designed to operate under 200° C. may be dangerous since hot spots may develop in the reactor which could cause spot failure of the coolant channels or the fuel casings. Other materials of construction are not as suitable as aluminum either because of cost or because of unfavorable neutron capture cross section.

It has been found that an alloy of aluminum and nickel is not subject to intergranular corrosion by water at temperatures up to 350° C. and is therefore suitable for use in water-cooled reactors in which the water may attain a temperature of over 200° C. Examples of such reactors include the water-cooled, graphite-moderated reactor disclosed on pages 37-39 of the previously cited patent to Fermi et al. and the water-cooled, water-moderated reactor disclosed in application Serial No. 518,427, filed June 28, 1955, in the name of Samuel Untermeyer. As the cross section of nickel is higher than that of aluminum, it is desirable to employ an alloy of aluminum and nickel containing a minimum amount of nickel. It has been found that a small amount of iron included in the alloy makes it possible to reduce the amount of nickel to a point where the total neutron capture cross section of the alloy is reduced while retaining the desired corrosion resistance. Therefore, for optimum results in a reactor a ternary alloy of aluminum, nickel and iron may be employed.

It is accordingly an object of this invention to provide a subassembly for a water cooled nuclear reactor in which the casings for the fuel elements and the coolant tubes are formed of a material which is resistant to corrosion by water at high temperatures.

It is a further object of the invention to provide a coating or casing for bodies of a fissionable material which is resistant to corrosion by water at temperatures above 200° C. so that the bodies may be used as fuel elements in a water-cooled neutronic reactor.

It is also an object of the invention to provide an aluminum-nickel alloy for use in a neutronic reactor which combines resistance to high temperature water corrosion with a low neutron capture cross section.

These and other objects are accomplished by the use of an alloy of aluminum and nickel in those portions of a water-cooled neutronic reactor which come into contact with the water.

The invention will be further described by reference to the accompanying drawings wherein:

Figure 1 is a perspective view of a subassembly for a neutronic reactor comprising moderator, coolant tubes, and fuel elements in which the subassembly is shown in partial cross section;

Figure 2 is a perspective view of a different type of fuel element in which a part of the fuel element is broken away;

Figures 3 to 6 are graphs illustrating the improved results attained by the use of this invention.

As shown in Figure 1 the subassembly comprises a solid moderator 10, a coolant tube 11, and ribs 12 which space fuel elements 13 from the tube 11, forming a coolant channel 14 therebetween. Fuel elements 13 are composed of cylindrical uranium slugs 15 provided with a protective jacket or casing 16. The arrangement of elements is that shown in Figure 39 of the Fermi et al. patent previously referred to. The coolant water passes through the channel 14. A water-cooled reactor may be operated under conditions whereby this water may reach a temperature above that at which commercial 2S alloy disintegrates in a short time. Therefore, the coolant tube 11 and the protective jacket 16 in the subassembly shown in Figure 1 are formed of an alloy of aluminum and nickel.

The fuel element may also be constructed so that cooling fluid flows both inside and outside of the uranium slug. In this case there is a channel for the cooling fluid passing through the center of the slug and the hereinafter described alloy is used to coat both inside and outside of the uranium slug.

Figure 2 shows a different type of fuel element which may be constructed with a casing of an aluminum-nickel alloy. The fuel element consists of a core 20 which may be uranium and of a jacket designated by reference numeral 21. The core 20 is enclosed in a rectangular block 22 made of the aluminum-nickel alloy according to this invention and in two cover plates, 23 and 24, also made of the aluminum-nickel alloy. Elements 22, 23 and 24 form the jacket 21. The entire assembly has been subjected to rolling whereby bonding of the various elements has been attained. A fuel element of this type may be contained within a coolant tube of the same or different shape to that shown in Figure 1. In any case the coolant tube may likewise be made of the same alloy.

The alloy employed consists of aluminum alloyed with a minimum of 2% nickel or in the alternative with a minimum of .5% nickel and .3% iron. The ternary alloy is most suitable for use in a reactor since the total neutron capture cross section is less than that of the binary alloy.

The alloy may be prepared from high purity aluminum or from 2S alloy. If the starting point is high purity aluminum, either 2% nickel may be added to it or .5% nickel and .3% iron. If the starting material is 2S alloy, .5% nickel only need be added as commercially pure aluminum, or 2S alloy, always contains at least .3% iron.

The alloys were made in several different ways. Vacuum melting and casting were performed in a suitable furnace using pure graphite crucibles. A minimum vacuum of 10⁻⁴ mm. of mercury was maintained. Air cast alloys were made in a small resistance-heated furnace, using Alundum crucibles. An induction furnace (6 kw.) was used exclusively after it became available, since the inductive stirring action rapidly dissolved the alloying elements.

In preparing the alloy the starting material, either high purity aluminum or commercially pure aluminum, was melted as above described. Silicon was added to the melt as a 12% master alloy and iron was added as an 8.5% master alloy. Other elements were added directly and stirred into the melt at temperatures up to 950° C.

The alloys were prepared and cast in sheets approximately one-half inch in thickness. The sheets were cold rolled to approximately one-eight inch in thickness as it was observed that some as cast commercially pure aluminum samples are less effected by high temperature water corrosion than formed aluminum shapes. This ability to withstand corrosion of as cast samples was destroyed by working of the casting.

Sample size and shape varied with the material available but in most cases the specimens were approximately three-quarters inch by three inches by three thirty-seconds inch. A three thirty-seconds inch hole was drilled near one end. A fresh surface was prepared by wet grinding to four hundred grit with abrasive paper on a metallographic polishing wheel. Samples were then measured, degreased in freshly distilled methyl alcohol, and weighed on an analytical balance.

Corrosion tests were performed in two kinds of apparatus. In the first or static apparatus, stainless steel autoclaves (175 milliliter capacity) were filled approximately two-thirds full of the test solution. The solution was degassed by boiling in the autoclave just before sealing. The test temperature was maintained by an electrically heated, forced draft oven. Each time the autoclave was opened for inspection the solution was changed. Samples were suspended by an aluminum wire hook and insulated from the stainless steel by a mica washer in the gas phase.

The other or dynamic apparatus consisted of a high temperature, high pressure stainless steel piping system arranged so that up to 30 gal. per minute of water can be pumped therethrough at the desired temperature. The pressure within the piping system was 1000 pounds per square inch.

Static tests have been carried out at 315° C. to determine the effect of the addition of nickel on the corrosion of aluminum by water at high temperatures. The first two tests in Table 1 are control tests on high purity aluminum and commercially pure aluminum. The other tests were carried out on samples of 2S alloy consisting of 99.2% aluminum, .4% iron and .4% of impurities (mainly silicon) to which had been added varying amounts of nickel.

*Table 1*

[Weight gain, mg./cm.²]

| | Exposure time, hours | | | | | | | | |
|---|---|---|---|---|---|---|---|---|---|
| | 42 | 203 | 466 | 605 | 718 | 743 | 759 | 886 | 927 |
| High purity aluminum | (¹) | (¹) | (¹) | (¹) | (¹) | (¹) | (¹) | (¹) | (¹) |
| 2S alloy | 10.2 | (²) | (²) | (²) | (²) | (²) | (²) | (²) | (²) |
| Alloy contains: | | | | | | | | | |
| .5% nickel | 1.6 | 2.5 | 3.1 | 3.7 | ----- | 4.0 | ----- | 4.4 | 4.1 |
| 1.0% nickel | 2.1 | 3.1 | 3.5 | 3.8 | ----- | 4.0 | ----- | 4.3 | 4.3 |
| 1.5% nickel | 1.65 | 2.2 | 3.06 | 3.5 | 3.8 | ----- | 3.7 | ----- | ----- |
| 2.0% nickel | 1.15 | 2.1 | 2.7 | 3.1 | 3.4 | ----- | 3.5 | ----- | ----- |

¹ Sample disintegrated within 24 hours.
² Badly blistered—test discontinued.

These tests show that each of the samples containing nickel was vastly superior to the samples containing no nickel. Samples of high purity aluminum and of commercially pure aluminum completely disintegrate before the end of the test period, whereas samples containing nickel were still in good condition with moderate smooth deposits of corrosion product formed on them. It should be noted that iron was present in the samples containing nickel as the alloys were prepared from commercially pure aluminum which always contains a small amount of iron.

Upper limits on the amount of nickel which may be included in the alloy have not been determined as an alloy which contains the minimum amount of nickel consistent with satisfactory corrosion resistance at the temperatures at which the reactor is to be operated is preferable. However, samples including up to 4% nickel have been prepared and are satisfactory.

The results tabulated in Table 1 are plotted in Figure 3. The graphs show that there is very little effect on corrosion rate caused by varying the nickel content of the alloy from .5% to 2.0% when other variables are held as constant as possible. Therefore, data from a number of tests on castings containing from about .5% to 2.0% nickel were plotted in Figure 4. The slopes of these curves give a rough estimate of the effect of temperature on corrosion rates. At 290° C. the corrosion rate turns out to be .0038 cm./yr. (1.8 mils/year), at 315° C. the corrosion rate is .0085 cm./yr. (3 mils/year), and at 350° C. the corrosion rate is .024 cm./yr. (9 mils/year).

Table 2 compares the corrosion of a sample of annealed 2S alloy and a sample of an annealed alloy containing 1% nickel in 2S alloy. The test was carried out at 315° C. It is seen that the improvement in corrosion resistance is not destroyed by heat treatment of the sample.

*Table 2*

| | |
|---|---|
| 2S alloy | Disintegrated within four hours. |
| 1% Ni in 2S alloy | Good condition after two weeks. |

Weight gain tests on commercial wrought aluminum (2S alloy) have been carried out at 275° C. Table 3 shows the results obtained.

*Table 3*

| Time, hours: | Weight gain, mg./cm.² |
|---|---|
| 20 | .6 |
| 60 | 1.4 |
| 100 | 2.0 |
| 120 | 2.4 |
| 168 | 2.5 |
| 336 | 8.4 |
| 432 | 18.8 |

Comparison between Tables 1 and 3 shows that corrosion of a sample of aluminum containing no nickel is much worse at a temperature of 275° C. than it is at 315° C. for a sample containing nickel. Since corrosion increases with increased temperature as shown, for example in Figure 4, this illustrates the tremendous improvement effected in the alloy by the incorporation of a small amount of nickel therein.

As iron and silicon are invariably present in commercial 2S alloy, tests were made to determine the effect of iron and silicon on the corrosion resistance of aluminum. In the first group of tests iron and nickel were added to a high purity aluminum master alloy. The temperature at which the tests were carried out was 350° C.

*Table 4*

| Composition, percent | | | Metal corroded, mg./cm.$^2$ | Time, days |
|---|---|---|---|---|
| Ni | Fe | Si | | |
| .66 | .02 | .05 | ($^1$) | 6.3 |
| .66 | .21 | .06 | 3.1 | 6.3 |
| .66 | .58 | .06 | 3.1 | 6.3 |
| .66 | .95 | .07 | 2.2 | 6.3 |

$^1$ Disintegrated.

These tests indicate that an alloy containing only .66% nickel must contain iron to be corrosion resistant at 350° C. and that silicon is not essential. Another group of tests was run to determine the amount of iron that is necessary and the results are given in Table 5.

*Table 5*

| Composition, percent | | | Time, days | Remarks |
|---|---|---|---|---|
| Ni | Fe | Si | | |
| .50 | .00 | .04 | 1 | Disintegrated. |
| .50 | .10 | .01 | 1 | Do. |
| .50 | .22 | .01 | 1 | Areas of surface blistering. |
| .50 | .31 | .02 | 1 | Good condition. |

It is thus evident that approximately .3% of iron must be present in the alloy to obtain corrosion resistance when the amount of nickel is low. As commercial wrought aluminum always contains this much iron, no problem arises. The desired alloys may very simply be obtained by the addition of nickel to commercial wrought aluminum.

When the amount of nickel is raised to 2%, the alloy shows improved corrosion resistance even though no iron is present. The observed results indicate that samples containing 1% nickel and .2% iron and .5% nickel and .3% iron are equally corrosion resistant and that a sample of high purity aluminum containing 2% nickel, although not necessarily the equal in corrosion resistance to the ternary alloys, shows great improvement over 2S alloy or high purity aluminum. Apparently therefore the amount of nickel required varies inversely as the amount of iron present up to a maximum amount of iron of about .3%. More iron can be present but does not permit of a reduction in the amount of nickel.

Both iron and silicon were added in another group of tests.

*Table 6*

| Composition | | | Metal corroded, mg./cm.$^2$ | Remarks | Time, days |
|---|---|---|---|---|---|
| Ni | Fe | Si | | | |
| .50 | .30 | .30 | 5.1 | Some blistering | 6.3 |
| .50 | 1.11 | .33 | 3.9 | Good condition | 6.3 |

Silicon accordingly appears to be detrimental but can be accommodated by addition of sufficient iron or nickel.

In order to simulate more closely the conditions in a reactor, a series of dynamic flow tests were carried out in the dynamic apparatus described above. These tests were carried out at 260° C. on an alloy of aluminum and nickel containing .9% Ni. The results obtained from these tests are plotted in Figures 5 and 6. The tests of Figure 5 were carried out at a pH of 6.5 and of Figure 6 at a pH of 5. For comparative purposes the results of static tests at the same temperature are also plotted in Figures 5 and 6. Each point that is plotted on the curves represents the average weight gain of a number of samples.

As expected, the amount of corrosion is greater in the dynamic tests than in the static tests and the amount of corrosion increases with increased flow rate of water past the sample. Likewise the corrosion rate increases with increased flow rate but the increase is slight. At the end of 60 days the samples were still in good condition. High purity aluminum and 2S alloy will completely disintegrate under the conditions of these tests before the expiration of the 60-day period.

Comparison between Figures 4 and 5 indicates that corrosion is somewhat less at lower pH. This indicates that acid should be added to the solution for optimum results.

The above-described dynamic corrosion tests were all carried out by subjecting the samples to the corrosion effects of a stream of water which was circulated in a closed system and in which the system was not vented to the atmosphere. It has been found that much more corrosion is found in samples which were subjected to corrosion by a stream of water which was not recirculated or in which a recirculating system was vented to the atmosphere than is shown in the above-described tests. However, under the last mentioned conditions samples exposed to radiation in a nuclear reactor are as resistant to corrosion as were the samples in the described corrosion tests.

Sample plates formed of an aluminum alloy containing small amounts of nickel and iron were placed in cartridges similar to those used to hold fuel elements for nuclear reactors. Such cartridges are conventionally formed of a number of thin plates held so that water or other coolant can flow through the cartridges around the plates. One of these cartridges was placed in a nuclear reactor and immersed in a stream of water. Another cartridge was immersed in the same stream of water outside the field of radiation of the reactor. The rate of flow of the water was approximately 30 feet per second. The testing was intermittent and included 100 hours at 260° C., 125 hours at 238° C.–243° C., 325 hours at 220°–227° C., and 300 hours at 205°–210° C. The plates that were within the reactor received an estimated thermal flux of exposure of $1 \times 10^{21}$ neutrons per cm.$^2$. In addition both cartridges were subjected to the corrosive effect of a stream of water having a temperature between 200° C. and 260° C. for 75 hours and at a temperature below 150° C. for another 400 hours outside the field of radiation of the reactor.

The plates, as mounted in both cartridges, were arranged in two rows of three plates each with Row 1 at the left end. Row 1 of the in-pile cartridge was closest to the reactor core and received the highest flux.

The iron present in the samples was that present in the 2S alloy from which the samples were prepared.

*Table 7*

| Composition, percent Ni | Location | Row | Position | Weight loss, mg./cm.$^2$ |
|---|---|---|---|---|
| 0.5 | In-pile | 1 | Right | 4.71 |
| 0.5 | do | 2 | do | 5.02 |
| 1.0 | do | 1 | Center | 3.61 |
| 1.0 | do | 2 | do | 5.28 |
| 2.0 | do | 1 | Left | 3.11 |
| 2.0 | do | 2 | do | 5.58 |
| 0.5 | Out-of-pile | 2 | Right | 16.15 |
| 0.5 | do | 1 | Center | 15.40 |
| 1.0 | do | 1 | Right | 19.30 |
| 1.0 | do | 1 | Left | 19.65 |
| 2.0 | do | 2 | Center | 14.71 |
| 2.0 | do | 2 | Left | 15.00 |

Thus we see that the corrosion increases with an increase in distance from the core and that the out-of-pile samples show a large increase in corrosion over in-pile samples. The in-pile samples show satisfactory resistance to corrosion and the alloy may therefore be used to form coolant channels and casings or coating for fuel elements in a nuclear reactor.

A working hypothesis has been developed to explain the corrosion of aluminum by water at high temperatures and the improvement in corrosion resistance obtained by incorporation of nickel into an aluminum-nickel alloy. It is well known that a surface layer of aluminum oxide forms immediately on aluminum on exposure of the aluminum to water. It is postulated that protons from the solution diffuse through the aluminum oxide barrier layer and are reduced to atomic hydrogen at the metal-oxide interface. The hydrogen atoms may combine to form molecules or diffuse into the metal. Apparently neither the atoms nor molecules can readily diffuse back out through the oxide film. It is assumed that at elevated temperatures a significant fraction diffuses into the metal and collects at rifts or cavities to form nondiffusing molecular hydrogen. Pressure builds up within these rifts, cracking or bulging the soft metal into blisters. When these blisters rupture, water is admitted to the fresh metal producing more hydrogen at a point considerably below the normal metal surface. This process thus may become self-accelerating.

According to this theory an alloying agent which would provide a second phase of low hydrogen overvoltage to act as local corrosion cathodes for the rest of the aluminum grain would protect the alloy from this type of corrosion. The hydrogen would be released on the second phase rather than at the metal-oxide interface.

In order to test the theory other metals other than nickel were added to aluminum and the resulting alloy was tested for corrosion resistance. The alloys tested consisted of 2% of the metal in high purity aluminum. Of those tested cobalt, iron, copper, and platinum gave fair results on corrosion tests at 315° C. Each of these has a low hydrogen overvoltage. Cobalt and copper alloys were superior to the platinum and iron alloys but all were inferior to a vacuum-cast 1% nickel alloy.

Other elements tested included lead, tin, bismuth, and cadmium. Samples made from alloys containing 2% of these elements in high purity aluminum disintegrated on testing at 315° C. This is as expected since each of these elements has a high hydrogen overvoltage.

Protection of aluminum against disintegration by water at high temperatures may also be obtained by adding small quantities of certain salts to the water and maintaining a low pH. 50 parts per million $NiSO_4$ was added to the water used in a static corrosion test, and the water was acidified to a pH of 4 with sulfuric acid. After 48 hours the sample showed no blisters whereas a control sample was badly blistered. Other salts such as $Co^{++}$, $Cd^{++}$, $Sn^{++}$, $Cu^{++}$, and $Pb^{++}$ may also be used. Other nickel salts may also be used and the amount of $Ni^{++}$ may be reduced as low at 5 p. p. m. Comparative tests without pH control indicated that acid conditions are essential to satisfactory results.

It will be understood that this invention is not to be limited to the details given here nor to the theory promulgated here but that it may be modified within the scope of the appended claims.

What is claimed is:

1. In a water-cooled nuclear reactor, the improvement comprising coolant tubes formed from and fuel elements clad in a binary alloy of aluminum which contains between 2% and 4% nickel.

2. A subassembly for a water-cooled nuclear reactor comprising coolant tubes formed from and fuel elements clad in a ternary alloy of aluminum which contains from .5% to 2% nickel and approximately .3% iron.

3. A subassembly for a water-cooled nuclear reactor comprising a solid graphite moderator, coolant tubes imbedded in the moderator, and fuel elements disposed within the coolant tubes wherein the coolant tubes are formed from and the fuel elements are clad in a ternary alloy of aluminum containing approximately .5% nickel and .3% iron.

4. A fuel element for nuclear reactors having a high corrosion resistance to water at high temperatures consisting of a core of a fissionable material and a jacket all around the core, said jacket consisting of a binary alloy of aluminum which contains between 2% and 4% nickel.

5. A fuel element for nuclear reactors having a high corrosion resistance to water at high temperatures consisting of a core of a fissionable material and a jacket all around the core, said jacket consisting of a ternary alloy of aluminum which contains approximately .5% nickel and .3% iron.

6. In a water-cooled graphite-moderated nuclear reactor the improvement comprising coolant tubes imbedded in the graphite moderator and fuel elements containing a fissionable material disposed in the coolant tubes wherein said coolant tubes are formed from and said fuel elements are clad in an alloy consisting of 0.5 to 4.0% nickel, from .3 to 0% Fe, the balance being aluminum, the relative amount of iron being high when the amount of nickel is low.

7. A fuel element for nuclear reactors having a high corrosion resistance to water at high temperatures consisting of a core of fissionable material and a jacket all around the core, said jacket consisting of an alloy consisting of 0.5 to 4.0% nickel, from .3 to 0% Fe, the balance being aluminum, the relative amount of iron being high when the amount of nickel is low.

8. In a water-cooled graphite-moderated nuclear reactor the improvement comprising coolant tubes imbedded in the graphite moderator and fuel elements containing a fissionable material disposed in the coolant tubes wherein said coolant tubes are formed from and said fuel elements are clad in an aluminum alloy selected from the group consisting of binary alloys containing 2 to 4% nickel and ternary alloys containing 0.3 to 0.5% iron and 0.5 to 2% nickel.

9. A fuel element for nuclear reactors having a high corrosion resistance to water at high temperatures consisting of a core of fissionable material and a jacket all around the core, said jacket consisting of an aluminum alloy selected from the group consisting of binary alloys containing 2 to 4% nickel and ternary alloys containing 0.3 to 0.5% iron and 0.5 to 2% nickel.

10. In a water-cooled graphite-moderated nuclear reactor the improvement comprising coolant tubes imbedded in the graphite moderator and fuel elements containing a fissionable material disposed in the coolant tubes wherein said coolant tubes are formed from and said fuel elements are clad in an alloy containing 0.5 to 4% nickel and an amount of iron up to 0.3%, the balance being aluminum.

11. A fuel element for nuclear reactors having a high corrosion resistance to water at high temperatures consisting of a core of fissionable material and a jacket all around the core, said jacket consisting of an alloy containing 0.5 to 4% nickel and an amount of iron up to 0.3%, the balance being aluminum.

References Cited in the file of this patent

UNITED STATES PATENTS 2,708,656     Fermi et al. _____ May 17, 1955

(Other references on following page)

OTHER REFERENCES

The Aluminum Data Book. Reynolds Metal Co., 1950, Louisville, Ky., pp. 48, 49, 52.

Proceedings of the International Conference on the Peaceful Uses of Atomic Energy, vol. 9, United Nations, N. Y. (1956), held in Geneva Aug. 8–20, 1955, pp. 398, 400, 401.

TID–7506, Pt. I, U. S. AEC, Papers presented at the Technical Briefing Session held at Idaho Falls, Idaho, Nov. 1–2, 1955, pp. 5–16. (Available AEC Technical Inf. Ser., Oak Ridge, Tenn.).

The Reactor Handbook, vol. 3, AECD–3647, publ. by Technical Information Service, U. S. Atomic Energy Comm., declassified edition, February 1955, pp. 9, 10, 33, 35.

U. S. Atomic Energy Comm., HW–37636, Jan. 11, 1956, pp. 9–10.

UNITED STATES PATENT OFFICE
CERTIFICATE OF CORRECTION

Patent No. 2,871,176                                    January 27, 1959

Joseph E. Draley et al.

It is hereby certified that error appears in the printed specification of the above numbered patent requiring correction and that the said Letters Patent should read as corrected below.

Column 4, Table 1, first column, fifth line thereof, for "5% nickel" read -- .5% nickel --; line 44, for "1.8" read -- 1.5 --.

Signed and sealed this 1st day of March 1960.

(SEAL)
Attest:

KARL H. AXLINE                                         ROBERT C. WATSO<sup>r</sup>
Attesting Officer                                       Commissioner of Pat<